(12) United States Patent
Uyeno

(10) Patent No.: US 11,740,399 B2
(45) Date of Patent: Aug. 29, 2023

(54) LOW COST DISPERSIVE OPTICAL ELEMENTS

(71) Applicant: RAYTHEON COMPANY, Waltham, MA (US)

(72) Inventor: Gerald P. Uyeno, Tucson, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 1160 days.

(21) Appl. No.: 15/889,452

(22) Filed: Feb. 6, 2018

(65) Prior Publication Data

US 2019/0243034 A1 Aug. 8, 2019

(51) Int. Cl.
| | |
|---|---|
| *G02B 5/32* | (2006.01) |
| *G02B 5/02* | (2006.01) |
| *G02B 1/11* | (2015.01) |
| *G02B 5/18* | (2006.01) |

(52) U.S. Cl.
CPC ............... *G02B 5/32* (2013.01); *G02B 1/11* (2013.01); *G02B 5/0205* (2013.01); *G02B 5/18* (2013.01); *G02B 5/1814* (2013.01); *G02B 5/1852* (2013.01)

(58) Field of Classification Search
CPC ............... G02B 5/0242; G02B 5/0278; G02B 5/0236; G02B 5/0268; G02B 5/0221; G02B 5/02; G02B 5/021; G02B 5/0226; G02B 5/0284; G02B 5/32; G02B 5/18; G02B 6/02057; G02B 6/34; G02B 6/12; G02B 27/44; H01G 4/12; H04N 2201/04746; H04N 2201/04748; H04N 2201/04749; H04N 2201/04751; G03H 2225/23; B32B 18/00; C01F 7/08–85; C04B 35/5626; C04B 2235/3847; C04B 2235/3246; C04B 2235/322; C04B 2235/3856; C04B 2235/3222; C04B 2235/468; B23B 27/148
USPC .......................................................... 359/599
See application file for complete search history.

(56) References Cited

U.S. PATENT DOCUMENTS

| | | | | |
|---|---|---|---|---|
| 2,380,236 | A * | 7/1945 | Harker | G01N 23/205 378/76 |
| 3,531,676 | A * | 9/1970 | Robinson | H05B 33/12 313/483 |
| 4,703,469 | A * | 10/1987 | Pettigrew | G11B 7/24085 369/275.3 |
| 4,845,718 | A * | 7/1989 | Pistoresi | H01S 3/0903 372/2 |
| 5,907,436 | A * | 5/1999 | Perry | G02B 5/1814 359/569 |
| 6,458,734 | B1 * | 10/2002 | Sugimoto | H05K 1/024 361/321.5 |
| 6,617,216 | B1 * | 9/2003 | Hu | H01L 29/66545 257/E21.434 |

(Continued)

OTHER PUBLICATIONS

Schmidt et al., Polymer-based Nanocomposites by Sol-Gel Routes, Applications of, Encyclopedia of Materials: Science and Technology (Second Edition), 2001, pp. 7551-7562 (Year: 2001).*

(Continued)

*Primary Examiner* — Darryl J Collins
*Assistant Examiner* — Tamara Y. Washington
(74) *Attorney, Agent, or Firm* — Cantor Colburn LLP

(57) ABSTRACT

A dispersive optical element includes a substrate including a dielectric material, an optical coating arranged on the substrate, and a layer of material including a microscale feature arranged directly on the optical coating.

11 Claims, 3 Drawing Sheets

(56) References Cited

U.S. PATENT DOCUMENTS

| | | | | |
|---|---|---|---|---|
| 6,821,474 B2* | 11/2004 | Lauf | C01G 23/006 | 264/435 |
| 7,837,459 B2* | 11/2010 | Colburn | B82Y 10/00 | 216/44 |
| 8,852,690 B2* | 10/2014 | Karkkainen | C09C 1/3607 | 427/372.2 |
| 2001/0006421 A1* | 7/2001 | Parriaux | G01D 5/38 | 356/499 |
| 2002/0176463 A1* | 11/2002 | Bullington | H01S 5/187 | 372/45.01 |
| 2002/0176473 A1* | 11/2002 | Mooradian | H01S 5/142 | 372/92 |
| 2002/0183994 A1* | 12/2002 | Fuse | G02B 5/1847 | 703/6 |
| 2002/0192850 A1* | 12/2002 | Stoltz | G02B 6/124 | 438/22 |
| 2003/0197862 A1* | 10/2003 | Cohen | G02B 6/4215 | 356/328 |
| 2004/0114642 A1* | 6/2004 | Bullington | H01S 5/146 | 372/6 |
| 2004/0165637 A1* | 8/2004 | Bullington | G02B 6/4214 | 372/50.11 |
| 2005/0045799 A1* | 3/2005 | Deng | G02B 5/3083 | 250/200 |
| 2005/0191467 A1* | 9/2005 | Isano | G02B 5/3083 | 428/172 |
| 2005/0231806 A1* | 10/2005 | Barton | G02B 5/1857 | 359/566 |
| 2006/0019244 A1* | 1/2006 | Martinez | B82Y 15/00 | 435/5 |
| 2006/0050392 A1* | 3/2006 | Schulz | G02B 5/1861 | 359/573 |
| 2006/0126679 A1* | 6/2006 | Brennan, III | G02B 6/02266 | 372/30 |
| 2006/0148100 A1* | 7/2006 | Madison | G01N 33/567 | 436/518 |
| 2006/0231625 A1* | 10/2006 | Cumming | G01N 21/3581 | 235/454 |
| 2006/0285184 A1* | 12/2006 | Phillips | B41M 3/14 | 359/2 |
| 2007/0009380 A1* | 1/2007 | Cunningham | G01N 21/00 | 257/414 |
| 2007/0009968 A1* | 1/2007 | Cunningham | B82Y 20/00 | 435/7.9 |
| 2007/0070276 A1* | 3/2007 | Tan | G02B 5/3058 | 349/117 |
| 2007/0127123 A1* | 6/2007 | Brown | G02B 27/145 | 359/556 |
| 2008/0204744 A1* | 8/2008 | Mir | G01J 3/02 | 356/303 |
| 2009/0035934 A1* | 2/2009 | Sreenivasan | H01L 27/101 | 438/622 |
| 2009/0046362 A1 | 2/2009 | Guo et al. | | |
| 2009/0179637 A1* | 7/2009 | Cunningham | G01N 21/7743 | 324/304 |
| 2009/0207873 A1* | 8/2009 | Jansen | H01S 5/02296 | 372/50.12 |
| 2010/0148285 A1* | 6/2010 | Bauer | H03H 9/02866 | 257/416 |
| 2011/0128610 A1* | 6/2011 | Gunter | G02F 1/061 | 359/322 |
| 2012/0120493 A1* | 5/2012 | Simmonds | G02B 27/0172 | 359/566 |
| 2012/0250706 A1* | 10/2012 | Stiens | H01S 3/106 | 372/19 |
| 2012/0329209 A1* | 12/2012 | Song | H01L 21/02521 | 438/104 |
| 2013/0205263 A1* | 8/2013 | Lan | G06F 30/20 | 716/52 |
| 2014/0072720 A1 | 3/2014 | Watkins et al. | | |
| 2014/0167017 A1* | 6/2014 | Shinotsuka | H01L 51/56 | 257/40 |
| 2015/0130983 A1* | 5/2015 | Yamaguchi | G02B 5/3058 | 348/333.09 |
| 2016/0085000 A1* | 3/2016 | Chen | B81C 1/00388 | 359/569 |
| 2016/0284886 A1* | 9/2016 | Han | H01L 31/1804 | |
| 2017/0334788 A1* | 11/2017 | Goldsmith | C04B 35/5626 | |
| 2017/0338567 A1 | 11/2017 | Puscasu et al. | | |
| 2019/0243034 A1* | 8/2019 | Uyeno | G02B 1/11 | |
| 2019/0288481 A1* | 9/2019 | Sacks | H01S 3/2316 | |
| 2019/0334252 A1* | 10/2019 | Adams | H01Q 9/26 | |

OTHER PUBLICATIONS

Michael R. Beaulieu et al., "Large-Area Printing of Optical Gratings and 3D Photonic Crystals Using Solution-Processable Nanoparticle/Polymer Composites," ACS Photonics 1, pp. 799-805, Published Aug. 11, 2014.

International Application PCT/US19/15545; filing date Jan. 29, 2019; International Search Report and Written Opinion dated May 31, 2019.

* cited by examiner

LOW COST DISPERSIVE OPTICAL ELEMENTS

BACKGROUND

The present disclosure relates to optical elements, and more specifically, to dispersive optical elements.

Diffraction gratings are used in various devices, for example, monochromators and spectrometers. In optics, a diffraction grating is an optical component with a periodic structure that splits and diffracts light into several beams travelling in different directions. The directions of the emerging beams depend on the spacing of the elements of the period structure and the wavelength of the light. Diffraction gratings generally have ridges or rulings on their surface with spatial frequencies of about a wavelength. Such gratings can be either transmissive or reflective.

Traditional manufacturing techniques for forming materials and structures for diffraction gratings include semiconductor subtractive manufacturing processes. Such processes include building up material and then removing the material by masking (lithography) and etching processes. For example, subtractive manufacturing methods can include coating with a photoresist, exposing the photoresist to radiation, etching with reactive materials, and then removing the residual material.

SUMMARY

According to one or more embodiments, a dispersive optical element includes a substrate including a dielectric material, an optical coating arranged on the substrate, and a layer of material including a microscale feature arranged directly on the optical coating.

According to one or more embodiments, a dispersive optical element includes a substrate including a dielectric material, a first optical coating arranged on the substrate, and a layer of material including a microscale feature arranged directly on the first optical coating. A second optical coating is on the substrate on a side opposing the first optical coating.

According to one or more embodiments, a method of making a dispersive optical element including forming a film including microscale features by a roll printing process and attaching the film to a substrate including an optical coating. The film is attached directly to the optical coating.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
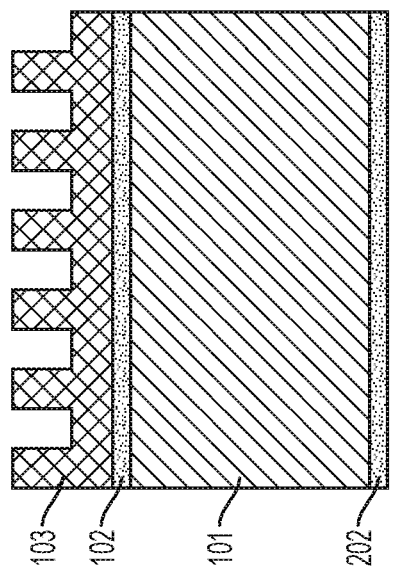
FIG. 1 is a side view of a dispersive optical element with a layer of material with microscale features arranged on a coated substrate.

Turning now to an overview of technologies that are more specifically relevant to aspects of the invention, traditional subtractive manufacturing techniques for making dispersive optical elements (diffraction gratings), particularly etching, can lead to defects in the etched material and the substrate beneath. Subtractive manufacturing techniques also use cleaning processes that can contaminate the etched surface and lead to significant reduction in the damage threshold. The costs of these processes are also high due to the number of processing steps involved.

Given the challenges of traditional lithography and etching processes for forming diffraction gratings, various attempts have been made to improve these processes. For example, the traditional subtractive manufacturing processes have been automated. Modifications to the processing steps have also been made in attempts to minimize defects and contamination. However, even such variations to the traditional subtractive methods are high cost and lead to defects in the gratings and substrates.

Turning now to an overview of the aspects of the invention, one or more embodiments of the invention address the above-described shortcomings by providing a lower cost method of making a dispersive optical element that utilizes additive manufacturing methods instead of conventional subtractive methods. Materials with microscale features are formed by roll printing manufacturing methods, and the material is then adhered to either an uncoated or coated substrate. Using the roll printed materials enables a variety of materials to be used for the dispersive elements, including for example, sintered ceramic materials, gold coated ceramic powders, doped ceramic powders, ultraviolet (UV) cured ceramic powders, and self-assembling polymers. The depth, width and spacing of the microscale features can also be varied across the width of the roller and over a distance up to the circumference of the roller. The depth, width and spacing of the microscale feature can also be varied along the circumference of the roller up to the width of the roller. An additional advantage of additive manufacturing methods is that they are low temperature processes that enable dispersive materials to be created on substrates coated with optical materials, such as antireflective coatings and high reflecting coatings that could not withstand high temperatures or residual stress of conventional subtractive manufacturing methods.

The dispersive optical elements disclosed herein can be used in a variety of applications, including but not limited to, monochromators, spectrometers, lasers, wavelength division multiplexing devices, optical pulse compressing devices, and other optical instruments.

As used herein, the terms "light" or "electromagnetic radiation" refer to light having a wavelength in the ultraviolet region, visible region, infrared region, microwave region, and/or radio wave region of the electromagnetic spectrum.

The dispersive optical elements described herein diffract light of wavelengths in the ultraviolet region of the electromagnetic spectrum (0.01 to 0.4 micrometers or microns), visible region (0.4 to 0.7 micrometers), infrared region of the electromagnetic spectrum (0.7 to 1,000 micrometers), microwave region of the electromagnetic spectrum (1,000 to 1,000,000 micrometers), and/or radio wave region of the electromagnetic spectrum (1,000,000 to 10,000,000,000,000 micrometers).

Turning now to a more detailed description of aspects of the present invention, FIG. 1 is a side view of a dispersive optical element having a material with microscale features arranged on a coated substrate according to embodiments of the invention. The substrate 101 is a rigid surface that provides mechanical support to the dispersive optical element. The substrate 101 includes one or more materials, such as one or more dielectric materials. Non-limiting examples of dielectric materials include magnesium fluoride, silicon dioxide, aluminum oxide, aluminum fluoride, cerium fluoride, lanthanum fluoride, neodymium fluoride, samarium fluoride, barium fluoride, calcium fluoride, lithium fluoride, and the like. Other suitable dielectric materials include zinc sulfide, zinc oxide, zirconium oxide, titanium dioxide, diamond-like carbon, indium oxide, indium-tin-oxide, tantalum pentoxide, ceric oxide, yttrium oxide, europium oxide, iron oxides such as (II) di-iron(III) oxide and ferric oxide, hafnium nitride, hafnium carbide, hafnium oxide, lanthanum oxide, magnesium oxide, neodymium oxide, praseodymium oxide, samarium oxide, antimony trioxide, silicon, silicon monoxide, silicon dioxide, glass, selenium trioxide, tin oxide, tungsten trioxide, and the like. Various mixtures or combinations of the above dielectric materials can also be employed. The thickness of the substrate 101 can vary and depends on the particular application for the dispersive optical element. According to one or more embodiments, the thickness of the substrate 101 is about 100 to about 100,000 micrometers. According to other embodiments, the thickness of the substrate 101 is about 1,000 to about 10,000 micrometers. The substrate 101 can transmit or absorb light of a given wavelength, depending on the particular application.

The material(s) forming the substrate 101 are selected and tailored such that they exhibit the desired optical response when irradiated with a beam of electromagnetic radiation in the ultraviolet wavelength range (0.01 to 0.4 micrometers), visible wavelength range (0.4 to 0.7 micrometers), infrared wavelength range (0.7 to 1,000 micrometers), microwave wavelength range (1,000 to 1,000,000 micrometers), or radio wavelength range (1,000,000 to 10,000,000,000,000 micrometers). Depending on the selection of materials, the substrate 101 transmits or absorbs light of a given wavelength in the ultraviolet, visible, infrared, microwave, or radio wavelength range.

Figure 2:
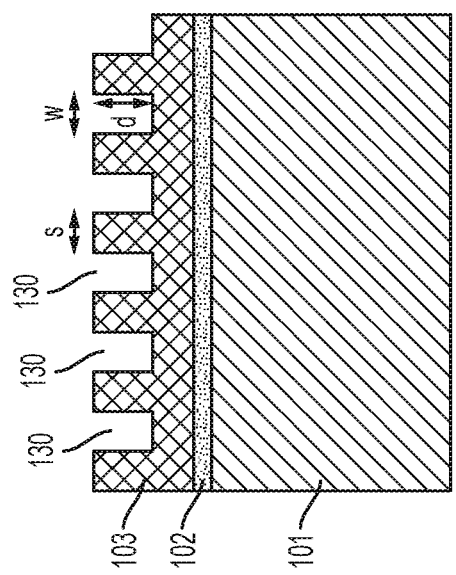
FIG. 2 is a side view of dispersive optical dispersive element with a layer of material with microscale features arranged on a substrate coated on both sides.
Figure 3:
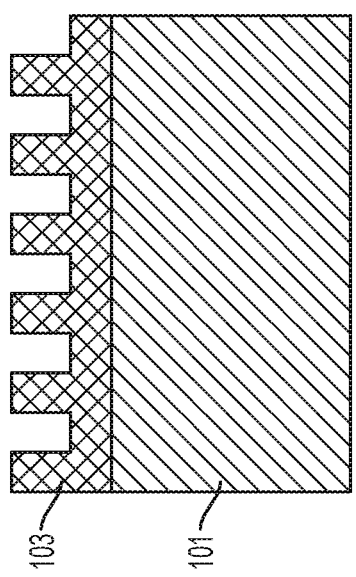
FIG. 3 is a side view of a dispersive optical element with a layer of material with microscale features arranged on a substrate.

An optical coating 102 is arranged on the substrate 101. The optical coating 102 is one or more thin layers of material deposited onto the substrate 101 that alters the way in which the substrate in combination with the coating reflects and transmits light. According to one or more embodiments, the light is ultraviolet, visible, infrared, microwave or radio wavelength light. The optical coating 102 is applied to one surface (one side) of the substrate 101 directly beneath the material 103 with microscale features, as shown in FIG. 1, in some embodiments. The optical coating 102 is also applied to two surfaces, first and second surfaces (opposing sides) of the substrate 101, as optical coating 102 and 202, as shown in FIG. 2 in other embodiments. According to one or more embodiments, the dispersive optical element includes a layer of material 103 including a microscale feature arranged directly on the substrate 101 (without a coating arranged therebetween), as shown in FIG. 3.

The optical coating 102 includes one layer (monolayer) or more than one layer (multilayers). When the optical coating 102 includes more than one layer, the materials forming the different layers can include different materials.

The optical coating 102 can be a thin layer(s) of metal, for example, aluminum, silver, or gold. The optical coating 102 can be a dielectric coating of a material with a different refractive index than the substrate 101. The dielectric coating includes thin layers of materials, for example magnesium fluoride, calcium fluoride, and various metal oxides.

The optical coating 102 can be a thin film of material, such as an antireflective (AR) coating or a high reflecting (HR) coating. Antireflective coatings are coatings that at least partially improve the antireflective nature of the substrate to which it is applied by reducing the amount of glare reflected by the surface of the substrate. For transparent substrates, antireflective coatings increase the percent transmittance as compared to an uncoated substrate. Non-limiting examples of antireflective coatings include a monolayer or multilayer of metal oxide (such as silicon dioxide), a metal fluoride, a metal nitride, a metal sulfide, or the like. An antireflective coating can be deposited onto the substrate 101 through, for example, vacuum evaporation, sputtering, or other suitable methods.

High reflecting coatings increase the overall reflectivity of the substrate surface and include one or more layers of dielectric materials and/or metals. Non-limiting examples of metals include aluminum, gold, silver, copper, nickel, platinum, and rhodium.

Thin film optical coatings, such as AR and HR coatings, can be easily damaged and therefore cannot be formed beneath a diffraction grating formed from conventional lithography and etching processing methods. However, as described herein, using a material 103 with already formed microscale features enables direct application to the rigid substrate 101 that can be coated with any desired optical coating 102. The integrity of the optical coating 102 is maintained due to low temperature processing used to adhere the material 103 to the coated substrate.

The material 103 is a film that includes microscale features formed by roll printing methods, such as roll-to-roll printing processes, in some embodiments. Roll printing processes use direct mechanical deformation to imprint microscale features (or patterns) into a thin layer of material. Such features are formed by methods that include one or more rotatable rollers, with at least one of the rollers having a plurality of protrusions that defines the pattern (with microscale features) to be applied to the material. The thin layer of material to be patterned is arranged between the patterning roller, a backing material, and a second roller or a substrate. As the rotatable rollers rotate, the thin layer of material is patterned with microscale features and adhered to the backing material.

The microscale features formed on the material 103 can be periodic and regular, or irregular. The microscale features on the surface of the material 103 are a plurality of grooves 130 having a depth (d) and width (w) with spacings (s) therebetween (see FIG. 1). Any or all of these dimensions are microscale. The microscale features have at least one dimension (depth, width, or spacing) that is less than about 100 micrometers is some aspects, less than 10 micrometers in other aspects, and less than 1 micrometer in some aspects. According to one or more embodiments, the microscale features have at least one dimension (depth, width, or spacing) that is about 0.1 micrometer. The microscale features have at least one dimension that is less than about 0.5 micrometers in some aspects, less than 0.1 micrometer in other aspects, and less than 0.01 micrometers in some aspects. As used herein, reference to microscale encompasses smaller structures, such as the equivalent nanoscale features. In some aspects, the microscale features have at least one dimension that is in a range from about 0.01 micrometers to 1000 micrometers.

According to one or more aspects, the material 103 includes a plurality of grooves with dimensions of 1×1×1 micrometer in depth, width and spacing. According to exemplary aspect, the material 103 includes a plurality of grooves with dimensions of 0.5×0.5×0.5 micrometers in depth, width, and spacing. According to some aspects, the material 103 includes a plurality of grooves with dimensions of 10×10×10 micrometers in depth, width, and spacing. According to other aspects, the material 103 includes at least one microscale feature having dimensions (grating spacings) in the ultraviolet, visible, infrared, microwave, or radio wavelength range.

Using roll printing processes to form the material 103 with the microscale features is advantageous because such methods are cost-effective. Rolls and machinery for forming the sheets of material are scaled up so that large sheets can be formed rapidly. Large sheets of material can then be cut to any desired size, for example into sheets having widths from 1 to 8 inches before adhering to the coated substrate.

Roll printing is used to rapidly and easily form the material 103 with the microscale features of any size that is then applied to the substrate 101 with the optical coating 102. The material 103 is adhered or attached by any suitable methods. The material 103 directly adheres to the optical coating 102 in some aspects (as shown in FIGS. 1 and 2). The material 103 also can adhere directly to the substrate 101 in other aspects (as shown in FIG. 3). In these embodiments, no additional material is need to directly stick the material 103 to the rigid substrate. In other embodiments, the material 103 is attached to the substrate 101 and/or coating with an adhesive arranged therebetween. The substrate 101 with the coating 102 provides a rigid surface for the material 103. Without the rigid surface of the substrate 101, the thin film of material 103 may not be stable as it could be easily damaged when stretched or applied to a surface without the substrate 101.

The materials and ordered pattern of the material 103 are selected to produce an optical response in the ultraviolet, visible, infrared, microwave, or radio wavelength region of the electromagnetic spectrum. The roller dimensions and patterns used to form the microscale features in the material 103 are varied to create the desired pattern.

The material 103 with microscale features may be formed of any suitable material, such as a ceramic material in some embodiments. The ceramic material may be a sintered ceramic material coated with a metal. A metal or a material including a metal is applied on the surface of the cured ceramic material. The metal material can be applied by a variety of suitable processes, including at least one process selected from: chemical vapor deposition, physical vapor deposition, shadow evaporation, and sputter deposition. While the desired metal depends upon the end-use application, the metal material can include, but is not limited to, gold, platinum, silver, copper, aluminum, chromium, nickel, titanium and mixtures and alloys thereof.

The ceramic material may be a sintered metal oxide. Non-limiting examples of metal oxides include aluminum oxide, titanium dioxide, or indium tin oxide. The ceramic material may be doped with rare earth materials. A material that is formed of a doped metal oxide may not have a coating of additional electrically conductive material, but an optional step includes coating a top surface of a sintered ceramic material with any suitable electrically conductive material. An example of a suitable coating material may be silver and the coating may have a thickness of less than 1 micron.

In another configuration of materials, the material 103 with microscale features may be formed of one or more curable polymer precursor, such as monomers or oligomers. Curable polymers are capable of undergoing a polymerization reaction when exposed to certain forms of energy, such as heat and/or actinic radiation (such as UV irradiation). Curing reactions can be initiated by activation of a curing agent species and can proceed by a cationic route or a free radical route, for example. In such embodiments, a liquid conductive polymeric precursor material is roll-printed to a sheet of polymeric material. The liquid is cured to a solid after printing. Non-limiting examples of curable polymer precursors include an epoxy precursor, epoxysiloxane precursor, negative tone photoresist precursor that undergoes UV radiation curing. Optionally, a metal or a material including a metal is applied on the surface of the cured polymeric material. The metal material can be applied by a variety of suitable processes, including at least one process selected from: chemical vapor deposition, physical vapor deposition, shadow evaporation, and sputter deposition. While the desired metal depends upon the end-use application, the metal material can include, but is not limited to, gold, platinum, silver, copper, aluminum, chromium, nickel, titanium and mixtures and alloys thereof.

In still another configuration of materials, two block copolymers may be used for roll-printing the material 103 with microscale features. The blocks of copolymers may self-assemble into the plurality of grooves forming the microscale features on the surface of the material 103.

The material used to form the material 103 with microscale features may be selected to produce an optical response in a particular portion of the electromagnetic spectrum. The material 103 may be tailored to reflect or transmit light in the ultraviolet, visible, infrared, microwave region, and/or radio wave region of the electromagnetic spectrum, for example.

Figure 4:
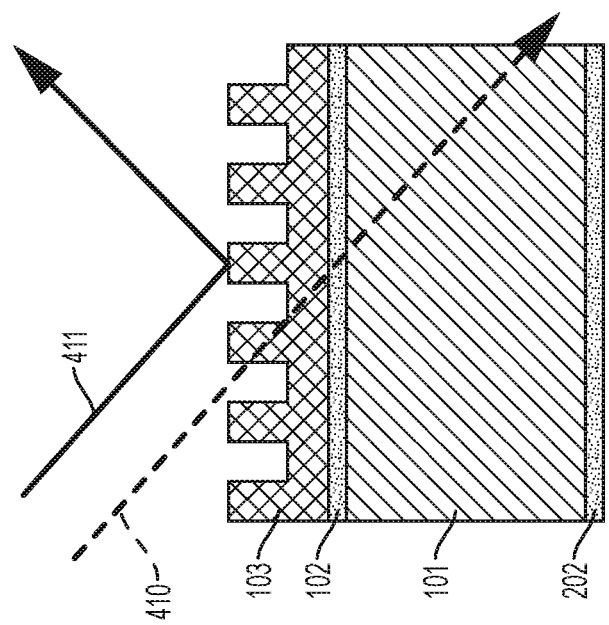
FIG. 4 is a side view of a dispersive optical element with a layer of material with microscale features arranged on a substrate with an antireflective coating.
Figure 6:
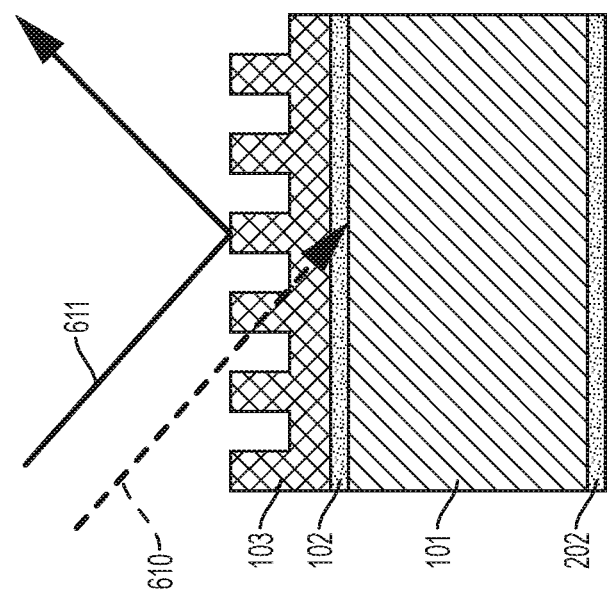
FIG. 6 is a dispersive optical element with a layer of material with microscale features arranged on a substrate with an absorbing material in between the layer of material and the substrate.
Figure 5:
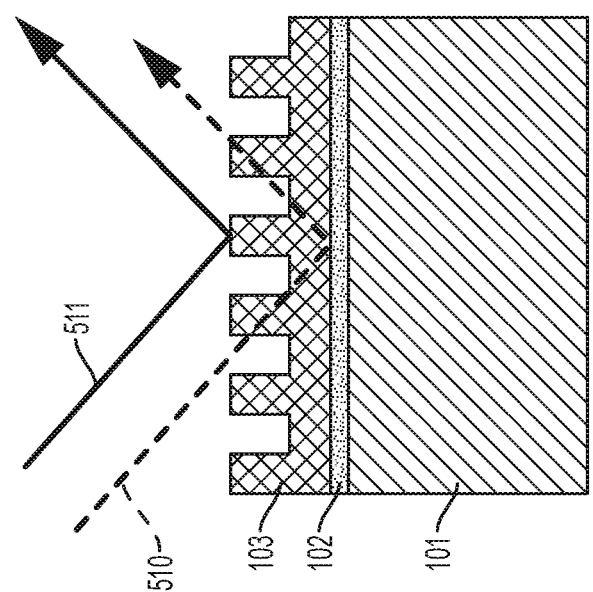
FIG. 5 is a side view of a dispersive optical element with a layer of material with microscale features arranged on a substrate with a high reflecting coating in between the layer of material and the substrate.

FIGS. 4-6 illustrate how the properties of the optical coating 102 and substrate 101 can be tailored to alter the reflectance or transmittance properties of the dispersive optical element.

FIG. 4 is a side view of a dispersive optical element in which the optical coating 102 is an antireflective coating. In the embodiments shown in FIG. 4, the dispersive optical element includes a layer of material with microscale features arranged on a substrate with an antireflective coating as the optical coating 102. The dispersive optical element is irradiated with a beam of electromagnetic radiation (for example a beam with a range of wavelengths in the ultraviolet, visible, infrared, microwave, or radio wavelength range). The material 103 with microscale features interacts with a portion of the light (one or more wavelengths of light) and is transparent to another portion of the light (one or more wavelengths of light). According to one or more embodiments, the one or more wavelengths of light is in the ultraviolet, visible, infrared, microwave, or radio wavelength range. According to embodiments, the layer of material 103 with the microscale feature diffracts light of a first wavelength (or wavelengths) and is transparent to light of a second wavelength (or wavelengths), and the optical coating 102 transmits light of the second wavelength (or wavelengths). The material 103 disposed on the antireflective coating allows for absorption or separation of unwanted light. In an exemplary embodiment, the electromagnetic beam includes light having $\lambda_1$ 411 and $\lambda_2$ 410. The material 103 with microscale features interacts with and diffracts light of $\lambda_1$ 411 and is transparent to (transmits) light of $\lambda_2$ 410. The antireflective coating (optical coating 102) and the substrate 101 transmit light of $\lambda_2$ 410 (are transparent to light of $\lambda_2$ 410).

The dispersive optical element shown in FIG. 4 optionally includes a second coating 202 arranged on the other side of the substrate 101. The optical coating 202 is configured to enhance the performance of the optical dispersive element by either enhancing the transmission of light 410 through the substrate 101 and through the coating 202 or enhancing the transmission of light through the substrate and reducing the transmission through the coating 202 to guide the light within the substrate. For enhancing transmission, the second coating 202 includes, for example, thin layers of dielectric materials, for example magnesium fluoride, calcium fluoride, and various metal oxides. For reducing the transmission through coating 202, thin metals, for example, aluminum, silver, or gold may be used.

FIG. 5 is a side view of a dispersive optical element in which the optical coating 102 is a high reflecting coating. In the embodiments shown in FIG. 5, the dispersive optical element includes a layer of material 103 with microscale features arranged on a substrate 101 with a high reflecting coating in between the layer of material and the substrate. The optical dispersive element is irradiated with a beam of electromagnetic radiation (for example a beam with a range of wavelengths in the ultraviolet, visible, infrared, microwave, or radio wavelength range). The material 103 with microscale features interacts with a portion of the light (one or more wavelengths of light) and is transparent to another portion of the light (one or more wavelengths of light). According to embodiments, the layer of material 103 comprising the microscale feature diffracts light of a first wavelength (or wavelengths) and is transparent to light of a second wavelength (or wavelengths), and the optical coating 102 reflects light of the second wavelength (or wavelengths). The material 103 disposed on the high reflecting coating (optical coating 102) allows the dispersive optical element to reflect the light that the material 103 transmits. In an exemplary embodiment, the electromagnetic beam includes light having $\lambda_1$ 511 and $\lambda_2$ 510. The material 103 with microscale features interacts with and diffract light of $\lambda_1$ 511 and is transparent to (transmits) light of $\lambda_2$ 510. The high reflecting coating (optical coating 102) reflects light of $\lambda_2$ 510.

FIG. 6 is a dispersive optical element in which the optical coating 102 an absorbing material. In the embodiments shown in FIG. 6, the dispersive optical element includes a layer of material 103 with microscale features arranged on a substrate 101 with an absorbing material in between the layer of material 103 and the substrate 101. The optical dispersive element is irradiated with a beam of electromagnetic radiation (for example a beam with a range of wavelengths in the ultraviolet, visible, infrared, microwave, or radio wave range). The material 103 with microscale features interacts with a portion of the light (one or more wavelengths of light) and is transparent to another portion of the light (one or more wavelengths of light). In an exemplary embodiment, the electromagnetic beam includes light having $\lambda_1$ 611 and $\lambda_2$ 610. The material 103 with microscale features interacts with and diffract light of $\lambda_1$ 611 and is transparent to (transmits) light of $\lambda_2$ 610. The absorbing material (optical coating 102) absorbs light of $\lambda_2$ 610. Non-limiting examples of absorbing materials include silicon (for absorbing wavelengths less than about 1 micron), germanium (for absorbing wavelengths about or less than 2 microns), and magnesium fluoride (for absorbing wavelengths greater than about 9 microns). In some embodiments, the absorbing material is a semiconductor material.

The dispersive optical element shown in FIG. 6 optionally includes a second optical coating 202 arranged on the other side of the substrate 101. The coating 202 is configured to enhance the performance of the optical dispersive element by either enhancing the transmission of light 610 through the substrate 101 and through the coating 202 or enhancing the transmission of light through the substrate and reducing the transmission through the coating 202 to guide the light within the substrate.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements.

The phrase "selective to," such as, for example, "a first element selective to a second element," means that the first element can be etched and the second element can act as an etch stop.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

As used herein, the term "about" modifying the quantity of an ingredient, component, or reactant of the invention employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like. In one aspect, the term "about" means within 10% of the reported numerical value. In another aspect, the term "about" means within 5% of the reported numerical value. Yet, in another aspect, the term "about" means within 10, 9, 8, 7, 6, 5, 4, 3, 2, or 1% of the reported numerical value.

It will also be understood that when an element, such as a layer, region, or substrate is referred to as being "on" or "over" another element, it can be directly on the other element or intervening elements may also be present. In contrast, when an element is referred to as being "directly on" or "directly over" another element, there are no intervening elements present.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A dispersive optical element, comprising:
   a substrate comprising a dielectric material;
   an optical coating arranged on the substrate; and
   a layer of material comprising a microscale feature arranged directly on and adhered to the optical coating, the layer of material being a sintered metal oxide, a sintered ceramic material, a curable polymer, or a self-assembled block copolymer.

2. The dispersive optical element of claim 1, wherein the optical coating is an antireflective coating or a high reflecting coating.

3. The dispersive optical element of claim 1, wherein the layer of material is a film that comprises a plurality of grooves.

4. The dispersive optical element of claim 1, further comprising another optical coating arranged on an opposing side of the substrate.

5. The dispersive optical element of claim 1, wherein the layer of material further comprises a metal layer.

6. The dispersive optical element of claim 1, wherein the layer of material comprising the microscale feature has a pattern of microscale features that are irregular.

7. The dispersive optical element of claim 1, wherein the dispersive optical element diffracts light in the visible region, the infrared region, the microwave region, or the radio wave region of the electromagnetic spectrum.

8. A dispersive optical element, comprising:
   a substrate comprising a dielectric material;
   a first optical coating arranged on the substrate;
   a layer of material comprising a microscale feature arranged directly on and adhered to the first optical coating, the layer of material being a sintered metal oxide, a sintered ceramic material, a curable polymer, or a self-assembled block copolymer; and
   a second optical coating arranged on the substrate on a side opposing the first optical coating.

9. The dispersive optical element of claim 8, wherein the layer of material comprising the microscale feature diffracts light of a first wavelength and is transparent to light of a second wavelength, and the optical coating reflects or transmits light of the second wavelength.

10. The dispersive optical element of claim 8, wherein the layer of material further comprises a metal layer.

11. The dispersive optical element of claim 8, wherein the dispersive optical element diffracts light in the visible region, the infrared region, the microwave region, or the radio wave region of the electromagnetic spectrum.

* * * * *